(12) United States Patent
Gilley

(10) Patent No.: US 11,291,169 B2
(45) Date of Patent: Apr. 5, 2022

(54) BROOM TUBE ASSEMBLY

(71) Applicant: Billy Gilley, Kennedale, TX (US)

(72) Inventor: Billy Gilley, Kennedale, TX (US)

( * ) Notice: Subject to any disclaimer, the term of this patent is extended or adjusted under 35 U.S.C. 154(b) by 202 days.

(21) Appl. No.: 16/668,106

(22) Filed: Oct. 30, 2019

(65) Prior Publication Data

US 2021/0127602 A1    May 6, 2021

(51) Int. Cl.
*A01G 20/47* (2018.01)
*A47L 5/14* (2006.01)
*A47L 9/06* (2006.01)

(52) U.S. Cl.
CPC ............. *A01G 20/47* (2018.02); *A47L 5/14* (2013.01); *A47L 9/0606* (2013.01)

(58) Field of Classification Search
CPC .......... A01G 20/47; A47L 5/14; A47L 9/0606
See application file for complete search history.

(56) References Cited

U.S. PATENT DOCUMENTS

| | | | | |
|---|---|---|---|---|
| 3,999,243 A * | 12/1976 | La Pour | ................ | E01H 1/0818 15/344 |
| 4,628,674 A * | 12/1986 | Dougan | ................... | A01D 7/10 16/422 |
| 4,945,604 A * | 8/1990 | Miner | ....................... | A47L 5/14 15/344 |
| 5,054,159 A * | 10/1991 | Richardson | ............. | A47L 13/06 15/400 |
| 5,652,995 A * | 8/1997 | Henke | ........................ | A47L 5/14 15/344 |
| 5,774,933 A * | 7/1998 | Jannicelli, Jr. | ............ | A47L 5/14 15/344 |
| 5,991,973 A * | 11/1999 | Simpson | ................... | A47L 9/06 15/402 |
| 6,353,960 B1 * | 3/2002 | Jannicelli, Jr. | ......... | A46B 17/02 15/106 |
| 6,422,835 B1 * | 7/2002 | Beauchard | ................ | A47L 5/14 15/344 |
| 6,494,514 B1 * | 12/2002 | Stinnett | .................... | A01K 1/01 294/59 |
| 6,647,586 B2 * | 11/2003 | Rogers | ...................... | A47L 5/36 15/323 |
| 7,510,225 B1 * | 3/2009 | Stinnett | .................... | A01D 9/00 294/59 |
| 7,716,857 B2 * | 5/2010 | Nagamatsu | ........... | E02F 3/7609 37/241 |
| 7,814,615 B1 * | 10/2010 | Ries | ......................... | A47L 5/14 15/405 |
| 8,042,223 B2 * | 10/2011 | Freewalt | .................. | A01D 7/00 15/405 |
| 8,225,450 B2 * | 7/2012 | Petersen | ............... | E01H 1/0809 15/106 |
| D734,903 S * | 7/2015 | Hames | .......................... | D32/15 |
| D792,664 S * | 7/2017 | Nardo | ............................ | D32/15 |

(Continued)

*Primary Examiner* — Marc Carlson

(57) ABSTRACT

A broom tube assembly for dislodging debris while employing a leaf blower includes an air tube that is mountable on an output of a leaf blower. A broom is provided and the broom is coupled to the air tube. The broom frictionally engages a surface being cleaned when the air tube is directed toward the surface. In this way the broom can dislodge debris for blowing the debris with the leaf blower. A plurality of brackets is each positioned around the handle. Each of the brackets engages the air tube for retaining the handle on the air tube.

5 Claims, 4 Drawing Sheets

(56) References Cited

U.S. PATENT DOCUMENTS

| | | | | |
|---|---|---|---|---|
| 2013/0255019 A1* | 10/2013 | Wood | ............... | A46B 15/0016 |
| | | | | 15/106 |
| 2021/0037945 A1* | 2/2021 | Julemont | ............. | A46B 13/005 |
| 2021/0108392 A1* | 4/2021 | Hahn | ...................... | E02F 3/96 |

\* cited by examiner

BROOM TUBE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to broom devices and more particularly pertains to a new broom device for dislodging debris while employing a leaf blower.

(2) Description of Related Art Including Information Disclosed Under 37 CFR 1.97 and 1.98

The prior art relates to broom devices.

BRIEF SUMMARY OF THE INVENTION

An embodiment of the disclosure meets the needs presented above by generally comprising an air tube that is mountable on an output of a leaf blower. A broom is provided and the broom is coupled to the air tube. The broom frictionally engages a surface being cleaned when the air tube is directed toward the surface. In this way the broom can dislodge debris for blowing the debris with the leaf blower. A plurality of brackets is each positioned around the handle. Each of the brackets engages the air tube for retaining the handle on the air tube.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
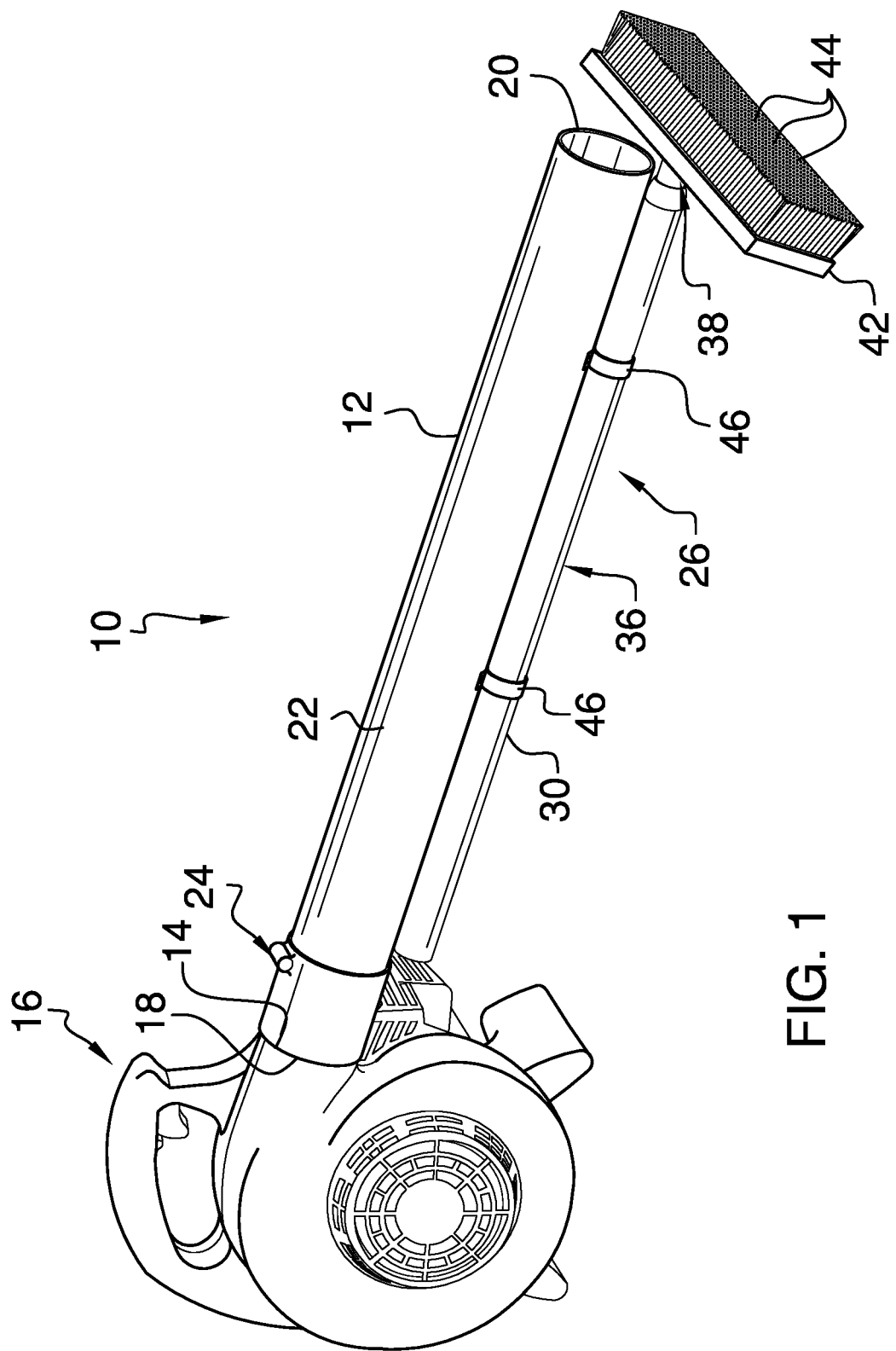
FIG. 1 is a perspective view of a broom tube assembly according to an embodiment of the disclosure.
Figure 2:
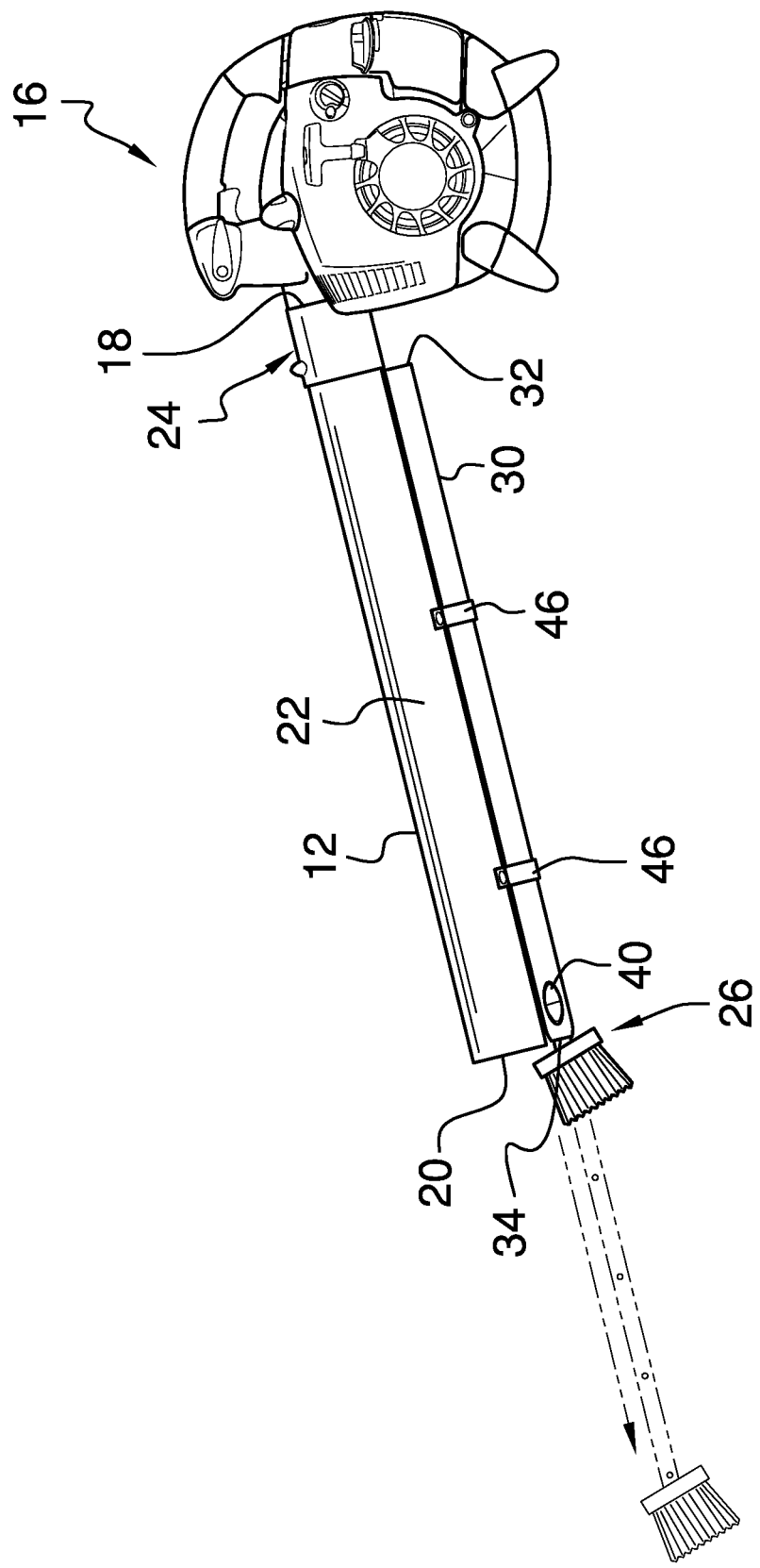
FIG. 2 is a left side view of an embodiment of the disclosure.
Figure 3:
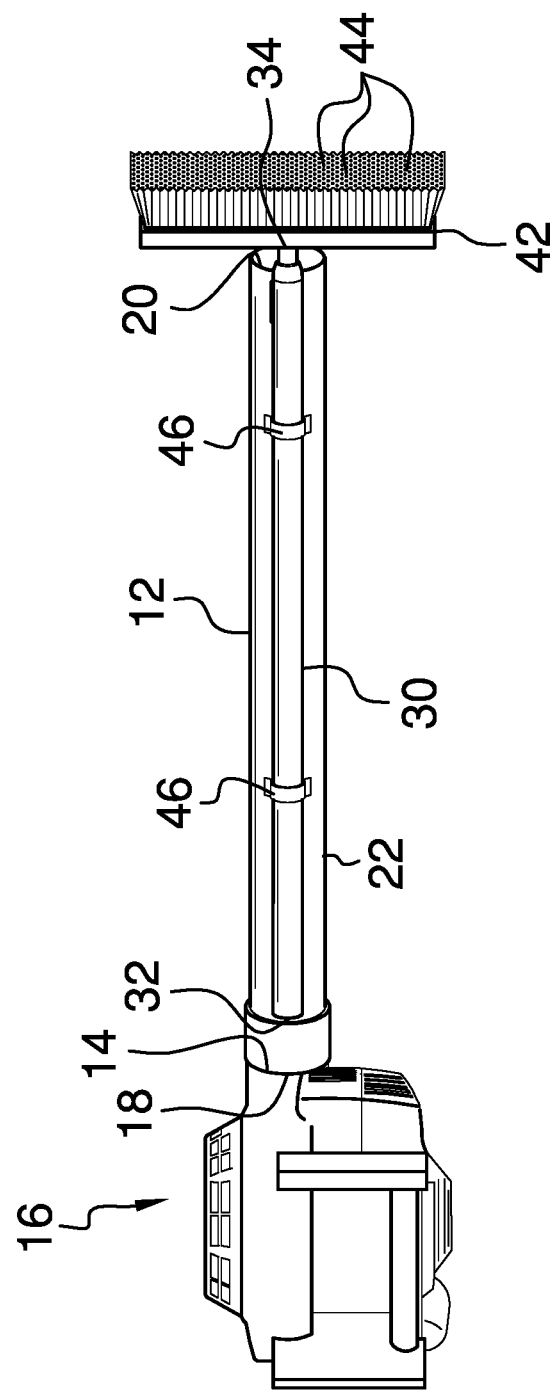
FIG. 3 is a bottom view of an embodiment of the disclosure.
Figure 4:
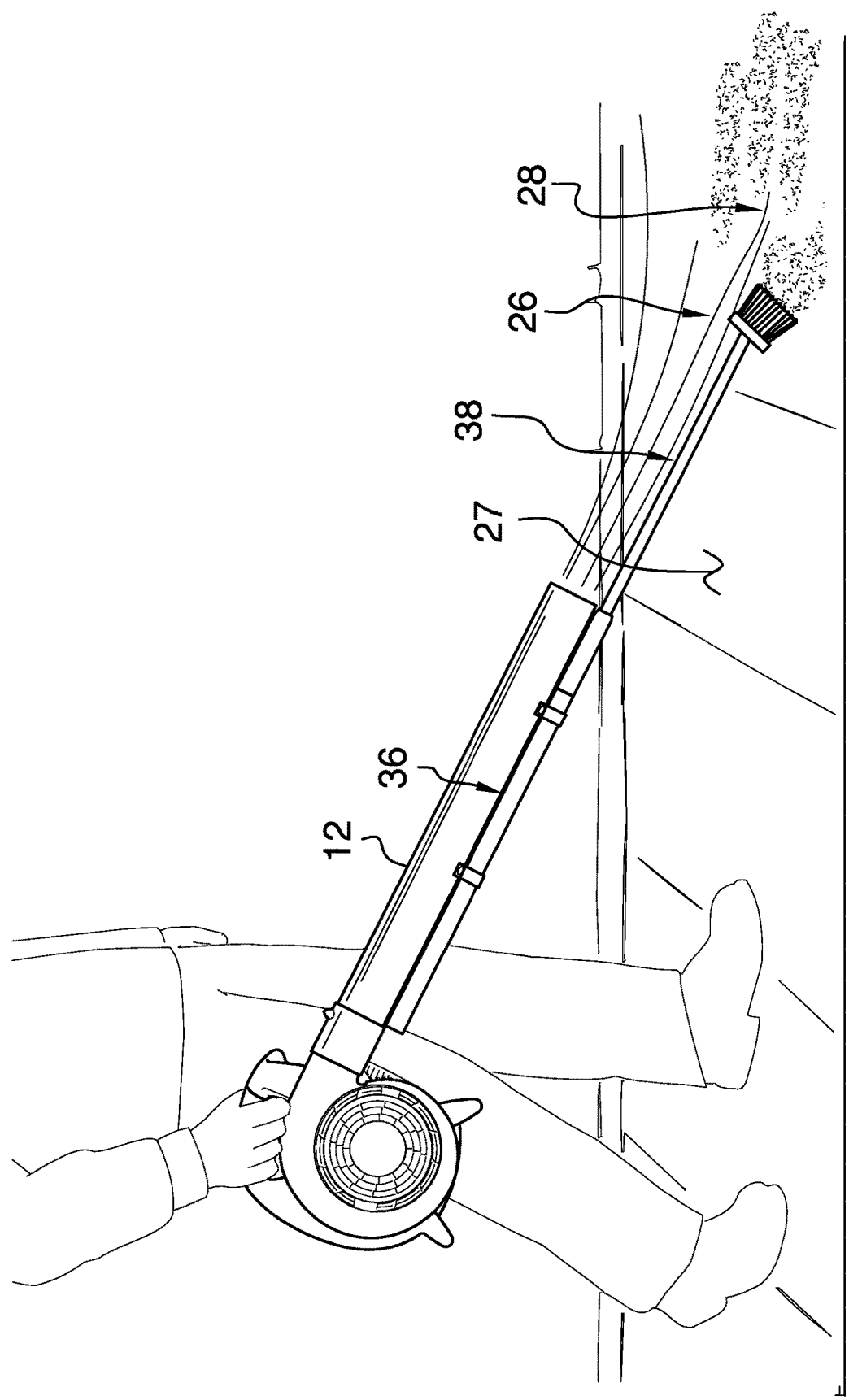
FIG. 4 is a perspective in-use view of an embodiment of the disclosure.

With reference now to the drawings, and in particular to FIGS. 1 through 4 thereof, a new broom device embodying the principles and concepts of an embodiment of the disclosure and generally designated by the reference numeral 10 will be described.

As best illustrated in FIGS. 1 through 4, the broom tube assembly 10 generally comprises an air tube 12 that is mountable on an output 14 of a leaf blower 16. In this way the air tube 12 blows air outwardly therefrom when the leaf blower 16 is turned on. The leaf blower 16 may be a gas leaf blower, an electric leaf blower or any other kind of powered leaf blower. The air tube 12 has a first end 18, a second end 20 and an outer wall 22 extending therebetween. The first end 18 engages the output 14 of the leaf blower 16 such that the air tube 12 is in fluid communication with the output 14. The air tube 12 may include a boot portion 24 that is positioned adjacent to the first end 18 and the boot portion 24 may be comprised of a resiliently stretchable material for accommodating various sizes of outputs on leaf blowers.

A broom 26 is coupled to the air tube 12 and the broom 26 frictionally engages a surface 27 that being cleaned when the air tube 12 is directed toward the surface 27. In this way the broom 26 dislodges debris 28 for blowing the debris 28 with the leaf blower 16. The surface 27 being cleaned may be a sidewalk, a driveway or any surface that is located outdoors. The debris 28 may be dirt, mud, leaves or any other material that has adhered to the surface 27.

The broom 26 comprises a handle 30 that has a primary end 32 and a secondary end 34. The handle 30 comprises a first section 36 that slidably receives a second section 38 such that the handle 30 has a telescopically adjustable length. The second section 38 has the secondary end 34 being associated therewith. The handle 30 is positioned on the outer wall 22 of the tube having the primary end 32 being aligned with the first end 18 of the air tube 12 and having the secondary end 34 being aligned with the second end 20 of the air tube 12.

The broom 26 includes a locking mechanism 40 that is movably coupled to the first section 36 of the handle 30. The locking mechanism 40 engages the second section 38 to retain the handle 30 at a selected length. Moreover, the locking mechanism 40 disengages the second section 38 when the locking mechanism 40 is manipulated for adjusting the length of the handle 30. The locking mechanism 40 may include a button that is movably positioned on the handle 30 and an engagement that is coupled to the button. The engagement may be biased to engage the second section 38 of the handle 30 and the engagement may disengage the second section 38 when the button is depressed.

The broom 26 includes a brush 42 is that coupled to the secondary end 34 of the handle 30. The brush 42 includes a plurality of bristles 44 that are directed away from the handle 30. Each of the bristles 44 frictionally engages the surface 27 for dislodging the debris 28 on the surface 27. The brush 42 can be spaced a selected distance beyond the second end 20 of the air tube 12 when the length of the handle 30 is increased. In this way the brush 42 can engage the surface 27 without requiring a user to bend over.

A plurality of brackets 46 is included and each of the brackets 46 is positioned around the handle 30. Each of the brackets 46 engages the air tube 12 for retaining the handle 30 on the air tube 12. Additionally, each of the brackets 46 is positioned on the first section 36 of the handle 30. Each of the brackets 46 may include a circular portion that surrounds the handle 30 and the brackets 46 may be retained on the air tube 12 with fasteners, such as screws or the like.

In use, the air tube 12 is attached to the outlet 14 of the leaf blower 16 to facilitate the broom 26 to be employed with the leaf blower 16. Alternatively, the brackets 46 and the handle 30 can be attached to an existing air tube of the leaf blower 16. The handle 30 of the broom 26 is adjusted to the selected length and the brush 42 is swept along the surface 27 while the leaf blower 16 is blowing air. In this way debris 28 that is stuck to the surface 27, and would otherwise resist being blown away, can be dislodged and subsequently blown away.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A broom tube assembly being configured to be mounted on a leaf blower for sweeping and blowing debris, said assembly comprising:
   an air tube being mountable on an output of a leaf blower wherein said air tube is configured to blow air outwardly therefrom when the leaf blower is turned on;
   a broom being coupled to said air tube, said broom frictionally engaging a surface being cleaned when said air tube is directed toward the surface wherein said broom is configured to dislodge debris for blowing the debris with the leaf blower, said broom having a handle and a brush, said handle having a primary end and a secondary end, said handle comprising a first section slidably receiving a second section, said second section having said secondary end being associated therewith, said brush being coupled to said secondary end of said handle, said brush including a plurality of bristles being directed away from said handle, said first section being adjustable relative to said second section wherein a position of said brush is adjustable relative to said air tube; and
   a plurality of brackets, each of said brackets being positioned around said handle, each of said brackets engaging said air tube for retaining said handle on said air tube.

2. The assembly according to claim 1, wherein said air tube has a first end, a second end and an outer wall extending therebetween, said first end engaging the output of the leaf blower such that said air tube is in fluid communication with the output.

3. The assembly according to claim 1, wherein said handle is positioned on said outer wall of said air tube having said primary end being aligned with said first end of said air tube and having said secondary end being aligned with said second end of said air tube.

4. The assembly according to claim 1, wherein said broom includes a locking mechanism being movably coupled to said first section of said handle, said locking mechanism engaging said second section to retaining said handle at a selected length, said locking mechanism disengaging said second section when said locking mechanism is manipulated for adjusting the length of said handle.

5. A broom tube assembly being configured to be mounted on a leaf blower for sweeping and blowing debris, said assembly comprising:
   an air tube being mountable on an output of the leaf blower wherein said air tube is configured to blow air outwardly therefrom when the leaf blower is turned on, said air tube having a first end, a second end and an outer wall extending therebetween, said first end engaging the output of the leaf blower such that said air tube is in fluid communication with the output;
   a broom being coupled to said air tube, said broom frictionally engaging a surface being cleaned when said air tube is directed toward the surface wherein said broom is configured to dislodge debris for blowing the debris with the leaf blower, said broom comprising:
     a handle having a primary end and a secondary end, said handle comprising a first section slidably receiving a second section such that said handle has a telescopically adjustable length, said second section having said secondary end being associated therewith, said handle being positioned on said outer wall of said air tube having said primary end being aligned with said first end of said air tube and having said secondary end being aligned with said second end of said air tube;
     a locking mechanism being movably coupled to said first section of said handle, said locking mechanism engaging said second section to retaining said handle at a selected length, said locking mechanism disengaging said second section when said locking mechanism is manipulated for adjusting the length of said handle; and
     a brush being coupled to said secondary end of said handle, said brush including a plurality of bristles being directed away from said handle, each of said bristles frictionally engaging the surface for dislodging the debris on the surface, said first section of said handle being adjustable relative to said second section of said handle wherein a position of said brush is adjustable relative to said second end of said air tube; and
a plurality of brackets, each of said brackets being positioned around said handle, each of said brackets engaging said air tube for retaining said handle on said air tube, each of said brackets being positioned on said first section of said handle.

* * * * *